United States Patent
Du Pont

[15] 3,690,102
[45] Sept. 12, 1972

[54] EJECTOR RAM JET ENGINE
[72] Inventor: Anthony A. Du Pont, 8 Georgeff Rd., Rolling Hills, Calif. 90274
[22] Filed: Oct. 29, 1970
[21] Appl. No.: 85,134

[52] U.S. Cl. ................................ 60/269, 60/270
[51] Int. Cl. ............................................ F02k 7/10
[58] Field of Search ......... 60/257, 269, 270 S, 270 R; 60/245

[56] References Cited

UNITED STATES PATENTS

| | | |
|---|---|---|
| 2,735,263 | 2/1956 | Charshafian ............... 60/257 |
| 3,261,571 | 7/1966 | Pinnes ........................ 60/257 |
| 3,040,520 | 6/1962 | Rae ............................ 60/257 |
| 3,237,400 | 3/1966 | Kuhrt ......................... 60/257 |
| 3,561,217 | 2/1971 | Hall ............................ 60/257 |
| 3,557,557 | 1/1971 | Frachar ...................... 60/257 |
| 2,948,112 | 8/1960 | Smith ......................... 60/270 R |
| 2,883,829 | 4/1959 | Africano .................... 60/245 |
| 3,172,253 | 3/1965 | Schelp et al. ............... 60/270 R |
| 3,379,187 | 8/1966 | Lindman .................... 60/269 X |
| 3,525,474 | 8/1970 | Von Ohain et al. ........ 60/269 X |

*Primary Examiner*—Carlton R. Croyle
*Assistant Examiner*—Robert E. Garrett
*Attorney*—Jessup & Beecher

[57] ABSTRACT

A hypersonic ram jet engine is provided which may be of the hydrogen fueled type and in which static and acceleration thrusts are provided as inherent features of the engine to accelerate the aircraft to speeds at which the ram jet engine can operate efficiently. The static and acceleration thrust is provided by the ram jet engine itself; this being achieved by injecting a secondary airflow into the engine at high pressure by the use of the engine's liquid hydrogen fuel to condense secondary air, as will be described.

3 Claims, 5 Drawing Figures

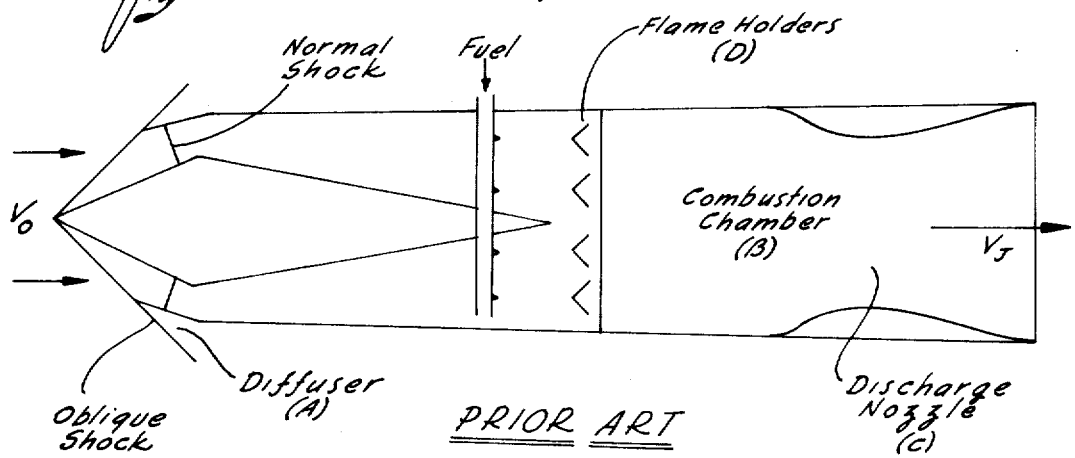
Fig. 1 (Fuel Injection System) PRIOR ART
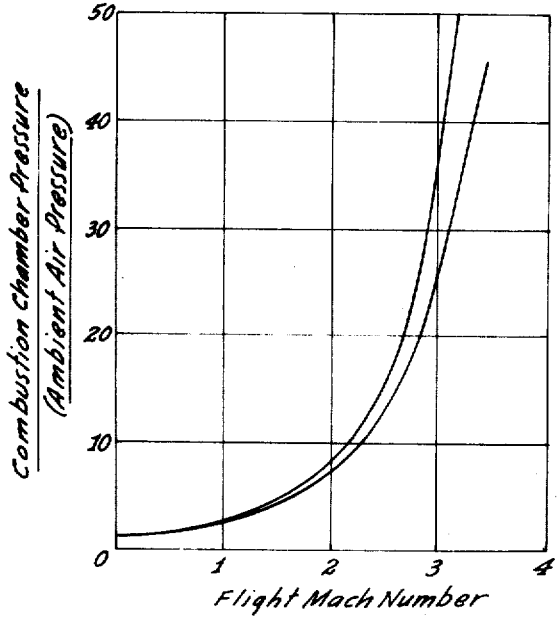
Fig. 2
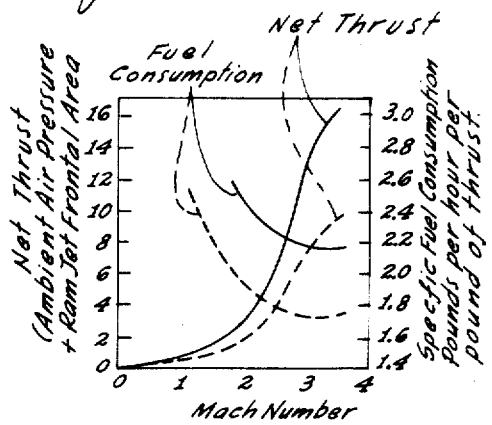
Fig. 3
INVENTOR:
Anthony A. duPont
By Keith D. Beecher
ATTORNEYS

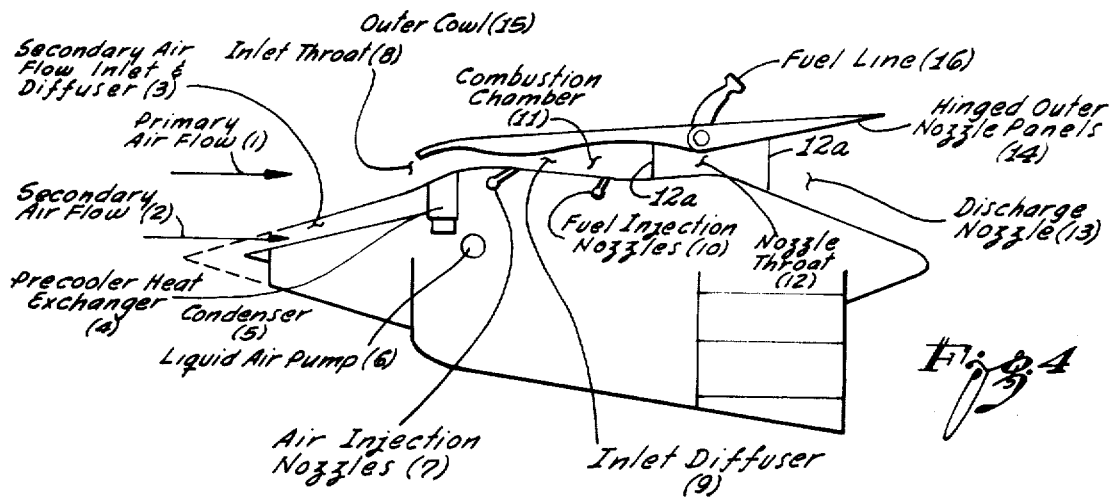
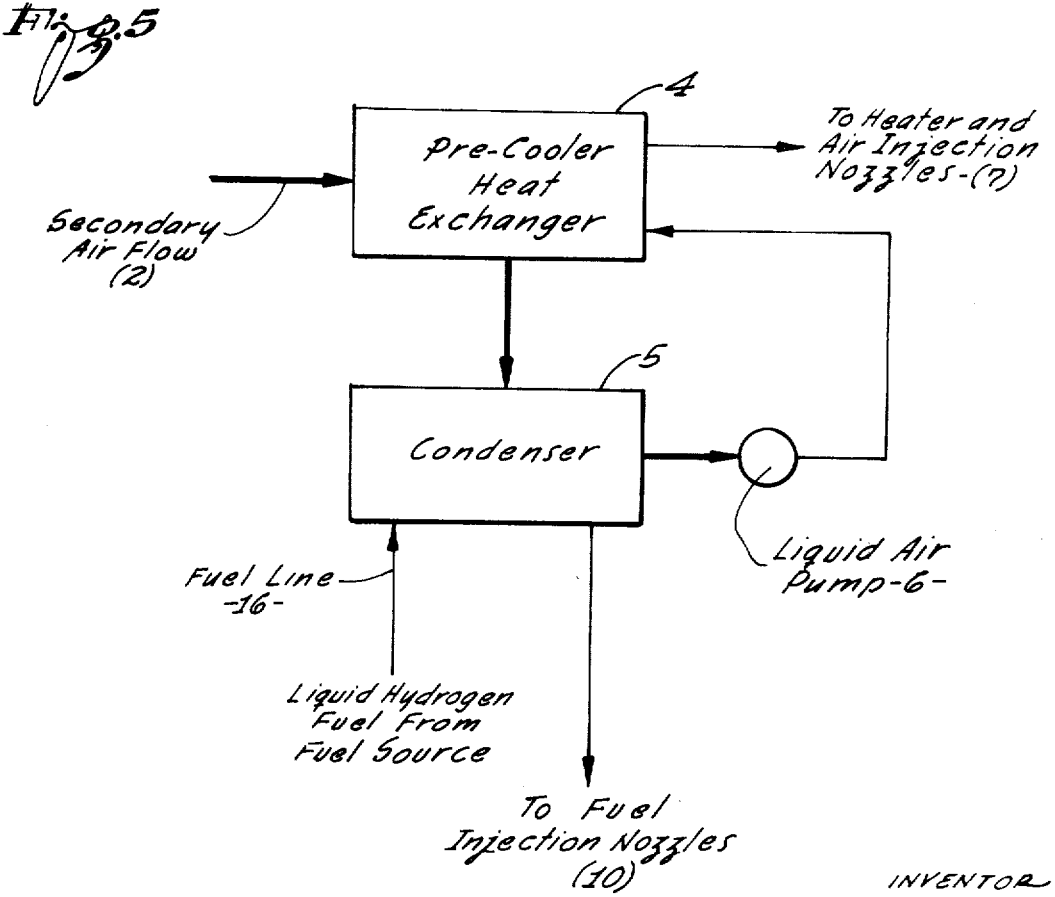

EJECTOR RAM JET ENGINE

BACKGROUND OF THE INVENTION

The present-day ram jet is the simplest of the air breathing propulsion engines. The principle of the ram jet cycle is to provide a jet velocity which is considerably greater than the initial velocity of the air entering the engine. The efficiency of the present-day ram jet in converting the chemical energy in the fuel into kinetic energy of the airstream depends upon the ratio of the pressure in the combustion chamber to ambient air pressure. This pressure ratio in turn depends upon the flight speed. At zero flight Mach number, there is no increase in pressure through the ram jet diffuser, and the efficiency of the usual prior art ram jet is zero. Thus, the prior art ram jet engine has no thrust at take-off, and it has been usual in the prior art to use a different type of boost engine for take-off of the aircraft or other space vehicle. In missiles, for example, a rocket is used to accelerate the vehicle to a speed at which the ram jet engine can take over. In the aircraft type of vehicle, where successive take-off and landings are desired, a turbo jet engine is often used in conjunction with the ram jet for take-offs.

In general, a supersonic ram jet must be boosted to supersonic flight speeds before the ram jet engine can provide sufficient thrust for propelling the vehicle. Ram jet engines are usually considered for applications in the range of flight Mach numbers between 2.5 and 8, although 8 is not a theoretical upper limit. As the flight Mach number increases above 4, heating of the vehicle by the high air friction becomes progressively a more serious problem, and methods of cooling the structure must be incorporated. At flight Mach numbers of 5 and higher, because of the high gas temperatures in the combustion chamber, dis-association of the gases occurs in the usual ram jet engine. That is, the combustion does not go to completion and only part of the heat is released. The remainder of the heat can theoretically be released if combustion continues as the gas expands through the discharge nozzle. Hydrogen fueled ram jet engines have been developed of the hypersonic type, which are capable of speeds up to and exceeding Mach 8, and the present invention is particularly concerned with such an engine. However, as pointed out above, it has been necessary in the prior art to provide separate and distinct booster engines in the vehicle to achieve the supersonic speeds at which the prior art ram jet engine can operate.

A primary object of the present invention is to provide an improved hydrogen fueled, hypersonic ram jet engine which, unlike the prior art engines does not require turbo jets, rockets, or other types of different booster engines to accelerate the vehicle to the speed at which the ram jet can operate efficiently. The present invention provides an efficient static and acceleration thrust by means of the ram jet engine itself.

The improved ram jet engine to be described is advantageous in that the vehicle may be accelerated up to the speeds at which the ram jet engine is effective without the need for separate booster engines, this being achieved in an extremely simple manner in which no moving parts other than pumps are required. The foregoing is achieved, as will be described by the use of the same duct as the ram jet engine and without compromising the ram jet geometry in any way. The result is an efficient, light and relatively inexpensive engine, as compared with the total requirements of the prior art vehicles.

BRIEF DESCRIPTION OF THE DRAWINGS

FIG. 1 is a schematic representation of a typical prior art ram jet engine;

FIG. 2 is a graph showing the characteristics of the prior art ram jet engine of FIG. 1, and illustrating the effect of flight Mach number on pressure ratio across the inlet diffuser of the prior art ram jet engine;

FIG. 3 is a graph showing further characteristics of the prior art ram jet engine, and specifically illustrating the effect of flight Mach number on thrust and specific fuel consumption of the prior art ram jet engine;

FIG. 4 is a schematic representation of a hypersonic ram jet engine modified to incorporate the injector system of the present invention; and FIG. 5 is a block diagram of the injection system of the invention, and which is incorporated into the hypersonic ram jet engine of FIG. 4.

DETAILED DESCRIPTION OF THE ILLUSTRATED/PRIOR ART RAM JET ENGINE AND OF THE ILLUSTRATED EMBODIMENT OF THE INVENTION

A usual prior art ram jet engine is illustrated schematically in FIG. 1. In flight, air enters the front of the diffuser (A) of the engine at high velocity $V_o^-$ corresponding to the flight speed. The diffuser (A) is shaped to reduce the speed of the incoming air, and hence, to reduce the kinetic energy of the air results in an equivalent increase in its potential energy, this being manifested as an increase in air pressure. The high pressure air enters the combustion chamber (B), into which fuel is continuously injected and burned. The hot gas is then discharged rearwardly through the exhaust nozzle (C) at a jet velocity $V_j$ which is greater than the aforesaid velocity $V_o$.

As a first approximation, thrust F may be expressed as:

$$F = M (V_j - V_o) \quad (1)$$

where:

$M$ is the mass of air per second flowing through the engine.

The objective of the ram jet cycle in the prior art engine, as mentioned above, is to provide a jet velocity $V_j$ which is considerably greater than the velocity $V_o$, the increase in air velocity representing an increase in kinetic energy. The efficiency of the prior art ram jet engine in converting the energy in the fuel into kinetic energy of the airstream depends upon the ratio of the pressure in the combustion chamber to the ambient air pressure. The aforesaid pressure ratio in turn depends upon the flight speed or, more exactly, upon the flight Mach number, as shown by the curves of FIG. 2.

At zero flight Mach number, in the case of the prior art engine of FIG. 1, there is no increase in pressure through the diffuser (A), and the efficiency of the prior art ram jet engine is zero, and the engine has no thrust at take-off. As the flight speed increases, the pressure ratio and hence the efficiency of the ram jet engine increases, which causes an increase in thrust and a reduction in specific fuel consumption, as shown by the curve of FIG. 3. In FIG. 3, the solid lines represent the fuel-air ratio adjusted for maximum thrust; and the broken lines represent the fuel-air ratio adjusted for maximum efficiency.

At any given flight Mach number, maximum thrust is developed by the prior art ram jet engine when sufficient fuel is injected into the combustion chamber to consume substantially all the oxygen in the air passing through the chamber. This represents the largest amount of heat which can be introduced into the air. Greater efficiency of utilization of the fuel, however, is obtained when less than the maximum burnable amount is injected. The efficiency of utilization of the fuel is represented by the specific fuel consumption (pounds of fuel consumed per hour to pound of thrust). The higher the efficiency, the lower is the specific fuel consumption. The curves in FIG. 3 are for the two operating conditions of maximum power and maximum efficiency.

The fuels used in the prior art ram jet engines are usually hydrocarbons obtained from petroleum. Such fuel burns in a narrow range of fuel-air ratios, and have flame speeds which are considerably lower than the speed at which the air passes through the combustion chamber in order to obtain a high thrust per unit of cross-sectional area, as required for practical applications. Flame holders, such as designated (D) in FIG. 1 are, therefore, located in the combustion chamber (B) in the wake of which air speeds are reduced locally to accommodate the low flame speed. The determination of the configuration and location of the flame holders (D) to provide adequate combustion efficiency without causing excessive drag on the air is one of the crucial development problems of the ram jet engine. The location and design of the fuel injection nozzles and the design of the control equipment to provide a suitable fuel-air ratio in the vicinity of the flame holder for efficient combustion over the range of flight speeds and altitudes desired in the flight program of a given ram jet vehicle are essential for efficient operation.

New high energy fuels greatly increase the attainable altitude of the ram jet and appreciably reduce the engine length. Hypersonic ram jet engines have been developed which are capable of speeds in excess of Mach 8, and which use liquid hydrogen fuel, and the system of the present invention will be described in conjunction with such a type of ram jet engine.

The system of the invention, as mentioned above, obviates the need for separate rockets or turbo jet engines to accelerate the vehicle up to speeds at which the ram jet can operate efficiently. Specifically, the injection system of the invention provides hot air injection to the ram jet itself so that it may be boosted to the supersonic flight speeds at which it can provide sufficient thrust for propelling the vehicle.

A schematic and diagrammatic representation of such a ram jet engine incorporating the system and apparatus of the present invention is shown, for example, in FIGS. 4 and 5. In the illustrated engine, primary airflow 1 is induced into the engine inlet 8 during normal supersonic ram jet flight. Secondary airflow 2 enters a separate inlet 3, which may be formed by retracting the tip of the inlet spike. The secondary air enters a heat exchanger 4 after diffusion in a diffuser 3. The coolant in the heat exchanger is previously liquified air, as best shown in the representation of FIG. 5.

Specifically, the incoming secondary airflow 2 leaves the heat exchanger 4 in a nearly liquid or partly liquid state and enters a condenser 5. The coolant for the condenser is the liquid hydrogen fuel which enters the engine through the fuel line 16 connecting the engine with the aircraft liquid hydrogen fuel tank. The secondary airflow leaves the condenser 5 and enters a liquid air pump 6. The liquid air pump pumps the liquid air to a high pressure. The airflow from the pump 6 passes through the pre-cooler heat exchanger 4, where it is used to cool the incoming secondary airflow 2. The air from the pre-cooler leaves as high pressure gaseous air, and it routed to the air injection nozzle 7. Before reaching the air injection nozzle, the air may be heated either by using it to cool the walls of the combustion chamber and nozzle or by burning it with a limited amount of fuel in a separate pre-heater combustion. The heated air expands through the air injection nozzle 7, and it reaches the pressure of the inlet throat 8 at a high velocity. This high velocity airstream mixes with the incoming primary airstream 1 increasing the velocity and total pressure of the incoming airstream.

When the engine of FIG. 4 is at rest, or moving too slowly to induce the required primary airstream 1 into the inlet throat 8, the high velocity secondary airstream induces the required airflow. The combined, pressurized airstreams diffuse in the ram jet inlet diffuser section 9, then enter the combustion chamber 10. The fuel is injected into the combustion chamber 10 through the fuel nozzle 11. Combustion occurs, and the hot gas is discharged through the nozzle throat 12, and it expands in the discharge nozzle 13. In the illustrated embodiment, the nozzle throat 12 is formed by struts 12a which connect the outer cowl 15 to the central part of the engine, and also provide a reduction in cross section area at the throat position. The outer portion of the discharge nozzle 13 is formed, for example, by hinged panels 14 which by balancing internal and external pressures automatically adjust to the correct nozzle expansion ratio.

The invention provides, therefore, an improved ram jet engine in which a secondary air supply is injected into the engine to provide static and acceleration thrusts as described. It will be appreciated, of course, that although a particular embodiment of the invention has been illustrated and described, modifications may be made, and it is intended in the following claims to cover all modifications which fall within the spirit and scope of the invention.

What is claimed is:

1. In a ram jet engine which includes a housing defining a primary air inlet and diffuser, a combustion chamber and a discharge nozzle; and which includes fuel injection nozzle means for injecting fuel into said combustion chamber, the combination of: means defining a secondary air inlet and diffuser for receiving a secondary air flow, air injection nozzle means positioned in said primary air inlet and diffuser, a condenser positioned in said secondary air inlet for receiving the secondary air and for liquifying the secondary air, and pump means for pumping the liquid air from said condenser to said air injection nozzle means to be expanded into said primary air inlet and diffuser through said air injection nozzle means.

2. The combination defined in claim 1, and which includes heat exchanger means, means directing the secondary air flow from said secondary air inlet through said heat exchanger means to cool the secondary air flow as it is introduced to said condenser, and means directing the liquid air from said pump through said heat exchanger means to cause said liquid air to change to high pressure gaseous air as it reaches said air injection nozzle means.

3. The combination defined in claim 2, in which said ram jet engine uses liquid hydrogen fuel, and which includes means for directing the liquid hydrogen fuel through said condenser to cause the air leaving said condenser to assume an essentially liquid state.

* * * * *